(12) United States Patent
Narita et al.

(10) Patent No.: US 11,410,065 B2
(45) Date of Patent: Aug. 9, 2022

(54) STORAGE MEDIUM, MODEL OUTPUT METHOD, AND MODEL OUTPUT DEVICE

(71) Applicant: FUJITSU LIMITED, Kawasaki (JP)

(72) Inventors: Kenichiroh Narita, Kawasaki (JP); Tatsuru Matsuo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 416 days.

(21) Appl. No.: 16/782,193

(22) Filed: Feb. 5, 2020

(65) Prior Publication Data

US 2020/0257999 A1    Aug. 13, 2020

(30) Foreign Application Priority Data

Feb. 7, 2019   (JP) .............................. JP2019-020981

(51) Int. Cl.
*G06N 20/00* (2019.01)
*G06N 7/00* (2006.01)
*G06N 5/04* (2006.01)

(52) U.S. Cl.
CPC .............. *G06N 7/005* (2013.01); *G06N 5/04* (2013.01); *G06N 20/00* (2019.01)

(58) Field of Classification Search
CPC ...... G06N 20/00; G06N 3/0427; G06N 3/084; G06N 5/022; G06N 5/04; G06N 5/045; G06N 7/005
See application file for complete search history.

(56) References Cited

U.S. PATENT DOCUMENTS

2017/0147928 A1* 5/2017 Vijayendra ............. G06F 9/448
2018/0189669 A1* 7/2018 Jeon ........................ G06N 20/00

OTHER PUBLICATIONS

Marco T. Ribeiro, et al., "Why Should I Trust You?: Explaining the Predictions of Any Classifier", KDD 2016: Proceedings of the 22nd ACM SIGKDD International Conference on Knowledge Discovery and Data Mining, Aug. 2016, San Francisco, CA, USA (Total 10 pages).

* cited by examiner

*Primary Examiner* — Insa Sadio
(74) *Attorney, Agent, or Firm* — Fujitsu Patent Center

(57) ABSTRACT

A storage medium storing a program that causes a computer to execute a process, the process includes obtaining a plurality of test data used for analysis of a classifier; obtaining a plurality of approximation models approximated to the classifier, each of separation boundaries of the plurality of approximation models being approximated to a different part of a separation boundary of the classifier; specifying, for each of the approximation models, a test data having a highest similarity from among the test data; specifying, for each specified test data, an approximation model having a second highest similarity with the specified test data from among the approximation models; selecting, from among the approximation models, an exclusion target model whose error with the specified approximation model is the smallest for each specified test data; and outputting the plurality of approximation models from which the exclusion target model is excluded for each specified test data.

7 Claims, 19 Drawing Sheets

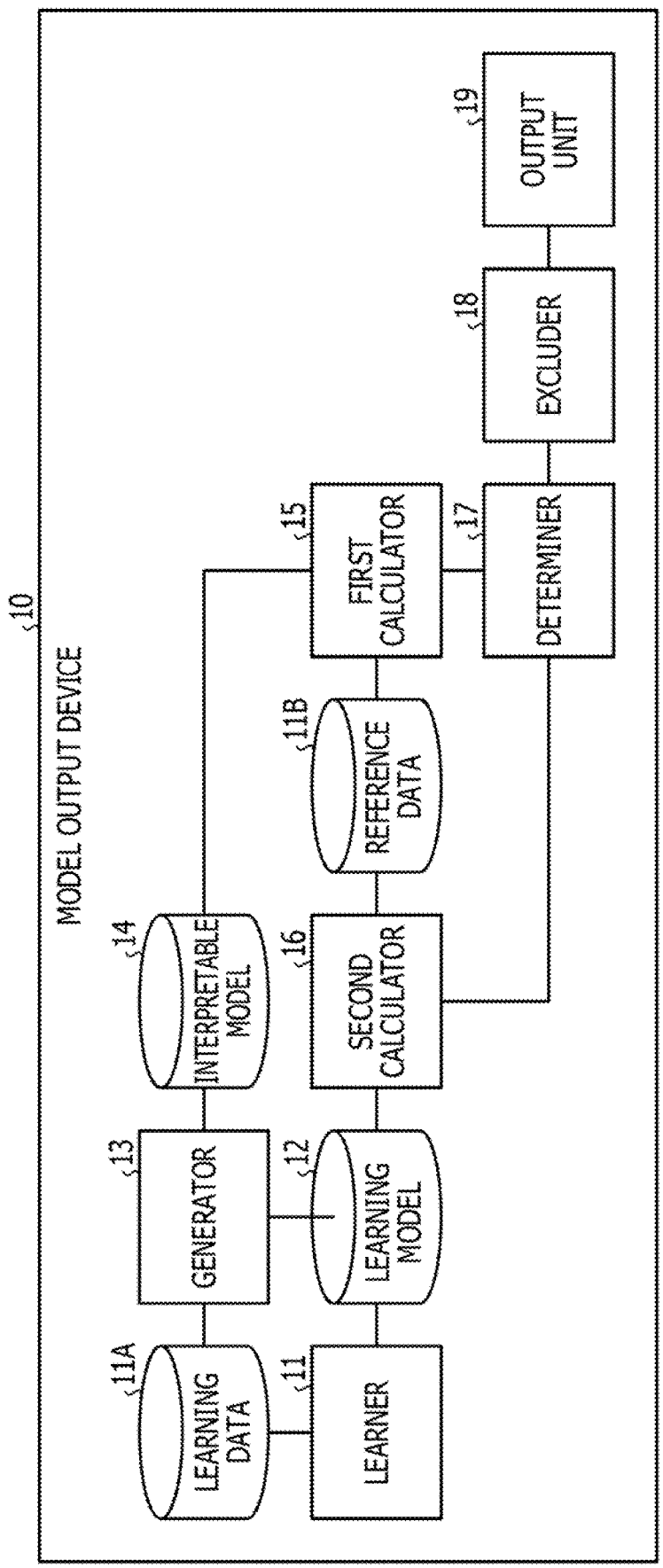

| CORPORATION ID | CLIENT ID | TRANSACTION PERIOD | TRANSACTION VALUE |
|---|---|---|---|
| AAA | AAB | FIRST HALF OF 2000 | $20,000 |
| AAA | AAB | FIRST HALF OF 2002 | $30,000 |
| AAA | BBB | FIRST HALF OF 2002 | $10,000 |
| BBB | AAA | FIRST HALF OF 2002 | $10,000 |
| CCC | AAC | SECOND HALF OF 2001 | $7,000 |
| ... | ... | ... | ... |

| dataID | mode1 | mode2 | mode3 |
|---|---|---|---|
| AAA | P1 | S1 | D3 |
| AAA | P2 | S2 | D4 |
| AAA | P3 | S2 | D2 |
| BBB | P4 | S2 | D2 |
| CCC | P5 | S3 | D1 |
| ... | ... | ... | ... |

FIG. 7A

SIMILARITY MATRIX S

| 0 | 1 | 2 | 3 | 4 |
|---|---|---|---|---|
| 3 | 0 | 1 | 4 | 2 |
| 3 | 4 | 0 | 1 | 2 |
| 3 | 4 | 2 | 0 | 1 |
| 2 | 1 | 3 | 4 | 0 |

REFERENCE DATA AXIS ↓
INTERPRETABLE MODEL AXIS →

FIG. 7B

ERROR MATRIX E

| 5 | 1 | 2 | 3 | 4 |
|---|---|---|---|---|
| 3 | 5 | 4 | 1 | 2 |
| 4 | 2 | 5 | 3 | 1 |
| 3 | 1 | 2 | 5 | 4 |
| 4 | 2 | 1 | 3 | 5 |

REFERENCE DATA AXIS ↓
INTERPRETABLE MODEL AXIS →

FIG. 7C

ERROR TOTAL VALUE

| 5 | 8 | 9 | 8 | 9 |
|---|---|---|---|---|
| 14 | 3 | 5 | 7 | 7 |

SIMILARITY MATRIX S

| 0 | 1 | 2 | 3 | 4 |
|---|---|---|---|---|
| 3 | 0 | 1 | 4 | 2 |
| 3 | 4 | 0 | 1 | 2 |
| 3 | 4 | 2 | 0 | 1 |
| 2 | 1 | 3 | 4 | 0 |

REFERENCE DATA AXIS ↓
INTERPRETABLE MODEL AXIS →

FIG. 7E

ERROR MATRIX E

| 5 | 1 | 2 | 3 | 4 |
|---|---|---|---|---|
| 3 | 5 | 4 | 1 | 2 |
| 4 | 2 | 5 | 3 | 1 |
| 3 | 1 | 2 | 5 | 4 |
| 4 | 2 | 1 | 3 | 5 |

REFERENCE DATA AXIS ↓
INTERPRETABLE MODEL AXIS →

FIG. 7F

ERROR TOTAL VALUE

| 5 | 6 | 9 | 3 | 9 |
|---|---|---|---|---|
| 7 | 2 | 2 | 4 | 7 |

SIMILARITY MATRIX S

| * | 1 | * | * |
|---|---|---|---|
| * | 1 | * | * |
| 1 | 2 | * | * |
| 1 | 2 | * | * |
| 1 | * | 2 | * |
| 1 | * | 2 | * |
| * | * | 1 | * |
| * | * | 1 | * |

ERROR MATRIX E

| * | 4 | * | * |
|---|---|---|---|
| * | 4 | * | * |
| 3 | 4 | * | * |
| 3 | 4 | * | * |
| 3 | * | 4 | * |
| 3 | * | 4 | * |
| * | * | 4 | * |
| * | * | 4 | * |

ERROR TOTAL VALUE

| 12 | 8 | 8 | * |
|----|---|---|---|
| *  | * | * | * |

FIG. 8B

SIMILARITY MATRIX S

| * | 1 | * | * |
|---|---|---|---|
| * | 1 | * | * |
| 1 | 2 | * | * |
| 1 | 2 | * | * |
| 1 | * | 2 | * |
| 1 | * | 2 | * |
| * | * | 1 | * |
| * | * | 1 | * |

ERROR MATRIX E

| * | 4 | * | * |
|---|---|---|---|
| * | 4 | * | * |
| 3 | 4 | * | * |
| 3 | 4 | * | * |
| 3 | * | 4 | * |
| 3 | * | 4 | * |
| * | * | 4 | * |
| * | * | 4 | * |

ERROR TOTAL VALUE

| 12 | 16 | 16 | * |
|----|----|----|---|
| *  | *  | *  | * |

☆ ★

ERROR AMOUNT MATRIX F

| 0 | 10 | 8 | 6 | 4 |
| 2 | 0 | 1 | 4 | 3 |
| 3 | 9 | 0 | 6 | 12 |
| 6 | 8 | 7 | 0 | 5 |
| 3 | 5 | 6 | 4 | 0 |

FIG. 10A

SIMILARITY MATRIX S

| | Model a | Model b | Model c | Model d | Model e |
|---|---|---|---|---|---|
| DATA 1 | 0 | 1 | 2 | 3 | 4 |
| DATA 2 | 4 | 0 | 1 | 2 | 3 |
| DATA 3 | 3 | 4 | 0 | 1 | 2 |
| DATA 4 | 2 | 3 | 4 | 0 | 1 |
| DATA 5 | 1 | 2 | 3 | 4 | 0 |

REFERENCE DATA AXIS ↓
INTERPRETABLE MODEL AXIS →

FIG. 10B

ERROR AMOUNT MATRIX F

| 0 | 10 | 8 | 6 | 4 |
|---|---|---|---|---|
| 2 | 0 | 1 | 4 | 3 |
| 3 | 9 | 0 | 6 | 12 |
| 6 | 8 | 7 | 0 | 5 |
| 3 | 5 | 6 | 4 | 0 |

DEGREE OF IMPACT

| 10 | * | * | * | * |
|---|---|---|---|---|

FIG. 12A

ERROR AMOUNT MATRIX F

| 0 | 10 | 8 | 6 | 4 |
|---|----|---|---|---|
| 2 | 0  | 1 | 4 | 3 |
| 3 | 9  | 0 | 6 | 12 |
| 6 | 8  | 7 | 0 | 5 |
| 3 | 5  | 6 | 4 | 0 |

DEGREE OF IMPACT

| 11 | × | 9 | 6 | × |

SIMILARITY MATRIX S

| | DATA 1 | 0 | 1 | 2 | 3 | 4 |
|---|---|---|---|---|---|---|
| REFERENCE DATA AXIS ↓ | DATA 2 | 4 | 0 | 1 | 2 | 3 |
| | DATA 3 | 3 | 4 | 0 | 1 | 2 |
| | DATA 4 | 2 | 3 | 4 | 0 | 1 |
| | DATA 5 | 1 | 2 | 3 | 4 | 0 |

MODEL a, MODEL b, MODEL c, MODEL d, MODEL e

INTERPRETABLE MODEL AXIS →

FIG. 13

| | RELATED METHOD | REFERENCE TECHNIQUE 1 (GREEDY METHOD) | EMBODIMENT (ELIMINATION GREEDY METHOD) |
|---|---|---|---|
| COMPLEX CALCULATION | PRESENT | ABSENT | ABSENT |
| CALCULATION COST | SET OF $n^3+n^2+n$ SIMULTANEOUS EQUATIONS | MATRIX OPERATIONS AS MANY AS n × NUMBER OF REFERENCE MODELS | MATRIX OPERATIONS AS MANY AS n × NUMBER OF REFERENCE MODELS |
| EXTRACTION OF REPRESENTATIVE EXAMPLE FROM VIEWPOINT OF ERROR | ○ | × | ○ |
| CALCULATION TIME | THREE DAYS OR MORE | 30 MINUTES | 30 MINUTES |

STORAGE MEDIUM, MODEL OUTPUT METHOD, AND MODEL OUTPUT DEVICE

CROSS-REFERENCE TO RELATED APPLICATION

This application is based upon and claims the benefit of priority of the prior Japanese Patent Application No. 2019-20981, filed on Feb. 7, 2019, the entire contents of which are incorporated herein by reference.

FIELD

The embodiments discussed herein are related to a storage medium, a model output method, and a model output device.

BACKGROUND

The advancement of machine learning brings about high performance classifiers, but also has an aspect in which it is difficult for humans to verify why the classifiers derive classification results.

For example, such an aspect may hinder application of a neural network for deep learning and the like to mission-critical fields in which accountability for the results is required.

In view of this, an algorithm called local interpretable model-agnostic explanations (LIME) is proposed as an example of a technique of explaining why the classification results are obtained and the grounds for the classification results.

In the LIME algorithm, there is an aspect in which analysis of a complex model is difficult. Accordingly, from the aspect of analyzing a complex model, a small number of representative examples which are capable of obtaining output approximate to the output of the classifier to the maximum extent are extracted by using the LIME.

For example, models g whose outputs are locally approximate to the output of the classifier f to be explained in the proximity of data u are generated as interpretable models of the classifier f. A combinatorial optimization problem of: similarity between the interpretable models g and pieces of reference data used for analysis of the classifier f; and output errors between the classifier f and the interpretable models g is solved and thereby a small number of interpretable models whose errors with respect to the output of the classifier f are small are extracted as representative examples. Elements greatly contributing to the classification are analyzed by using such representative examples. For example, Marco Tulio Ribeiro, Sameer Singh, Carlos Guestrin "'Why Should I Trust You?' Explaining the Predictions of Any Classifier" and so on are disclosed as related art.

SUMMARY

According to an aspect of the embodiments, a non-transitory computer-readable storage medium storing a program that causes a computer to execute a process, the process includes obtaining a plurality of test data used for analysis of a classifier; obtaining a plurality of approximation models approximated to the classifier, each of separation boundaries of the plurality of approximation models being approximated to a different part of a separation boundary of the classifier; specifying, for each of the plurality of approximation models, a test data having a highest similarity from among the plurality of test data; specifying, for each specified test data, an approximation model having a second highest similarity with the specified test data from among the plurality of approximation models; selecting, from among the plurality of approximation models, an exclusion target model whose error with the specified approximation model is the smallest for each specified test data; and outputting the plurality of approximation models from which the exclusion target model is excluded for each specified test data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram depicting an example of a functional configuration of a model output device according to Embodiment 1;

FIG. 7A is a diagram depicting an example of the similarity matrix;

FIG. 7B is a diagram depicting an example of the error matrix;

FIG. 7C is a diagram a depicting an example of total values of error ranks;

FIG. 7D is a diagram depicting an example of the similarity matrix;

FIG. 7E is a diagram depicting an example of the error matrix;

FIG. 7F is diagram a depicting an example of the total values of the error ranks;

FIG. 8A is a diagram depicting the case where an optimal solution is left out;

FIG. 8B is a diagram depicting the case where the optimal solation is left out;

FIG. 10A is a diagram depicting an example of the similarity matrix;

FIG. 10B is a diagram depicting an example of the error amount matrix;

FIG. 12A is a diagram depicting an example of the error amount matrix;

FIG. 12B is a diagram depicting an example of the similarity matrix;

FIG. 13 is a diagram for explaining one aspect of an effect;

DESCRIPTION OF EMBODIMENTS

However, the technique described above has an aspect of requiring huge calculation cost for extracting the representative examples.

For example, the aforementioned combinatorial optimization problem is formulated as a set of n^3+n^2+n simultaneous equations, where n is the number of interpretable models. Accordingly, the greater the number of the interpretable models is, the higher the calculation cost is. For example, when the classifier f is for deep learning, the interpretable models N are provided in a scale of 1000, 2000, or the like. Accordingly, even when a parallel calculator such as a graphics processing unit (GPU) is used, a period required to calculate the solution of the combinatorial optimization problem is long in the order of several days. In view of this, it is desirable to reduce the calculation cost for extracting the representative examples.

A model output program, a model output method, and a model output device according to the subject application are described below with reference to the attached drawings. The following embodiments do not limit techniques disclosed herein. The embodiments may be appropriately combined without contradiction of details of processes.

Embodiment 1

FIG. 1 is a block diagram depicting an example of a functional configuration of a model output device according to Embodiment 1. The model output device 10 depicted in FIG. 1 is a device configured to output a small number of interpretable models g which have small errors with respect to an output of a classifier f as representative examples, as part of an explaining function of explaining why the classification results are obtained in the classifier f and the grounds for the classification results.

[Example of Classifier]

An example of a learned model learned by deep tensor is given below as an example of the classifier f to be explained. "Deep tensor" described herein refers to deep learning in which tensor data obtained by tensorizing graph data is used as an input.

Figures 2A, 2B, 2C:
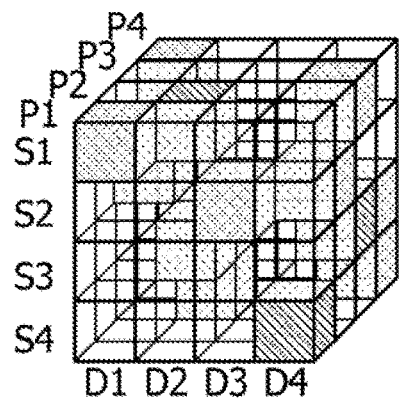
FIG. 2A is a diagram depicting an example of original data.
FIG. 2B is a diagram depicting an example of graph data.
FIG. 2C is a diagram depicting an example of tensor data.

An example of tensorization is described by using FIGS. 2A to 2C. FIG. 2A is a diagram depicting an example of original data. FIG. 2B is a diagram depicting an example of graph data. FIG. 2C is a diagram depicting an example of tensor data.

FIG. 2A depicts transaction data in a financial institution as an example of the original data. As depicted in FIG. 2A, the transaction data includes items such as a corporation identification (ID), a client ID, a transaction period, and a transaction value.

As an example, description is given of the case where a model is learned by deep tensor, the model configured to receive the transaction data depicted in FIG. 2A and output growth of each client corporation, for example, whether the future of the corporation is promising or not as a classification result.

In this case, the transaction data depicted in FIG. 2A is handled as graph data indicating coupling between nodes representing values such as the client ID, the transaction period, and the transaction value and nodes representing ties (corporation ID) as depicted in FIG. 2B. The graph data depicted in FIG. 2B is converted to tensor data which expresses whether ties (corporation ID) are present for a combination of values such as the client ID, the transaction period, and the transaction value by using a mathematical concept called tensor as depicted in FIG. 2C.

In the deep tensor, a partial graph structure contributing to classification in the inputted graph data is automatically extracted as core tensor. This extraction process is achieved by learning parameters for tensor decomposition of the tensor data while learning a neural network. The "tensor decomposition" described herein is calculation in which an inputted n-th order tensor is approximated by a product of tensors of the n-th order or lower. For example, the inputted n-th order tensor is approximated by a product of one n-th order tensor (referred to as core tensor) and n tensors of a lower order (when n>2, second-order tensors, for example, matrices are normally used). This decomposition is not unique and any partial graph structure in the graph structure expressed by the inputted tensor data may be included in the core tensor.

Figure 3:
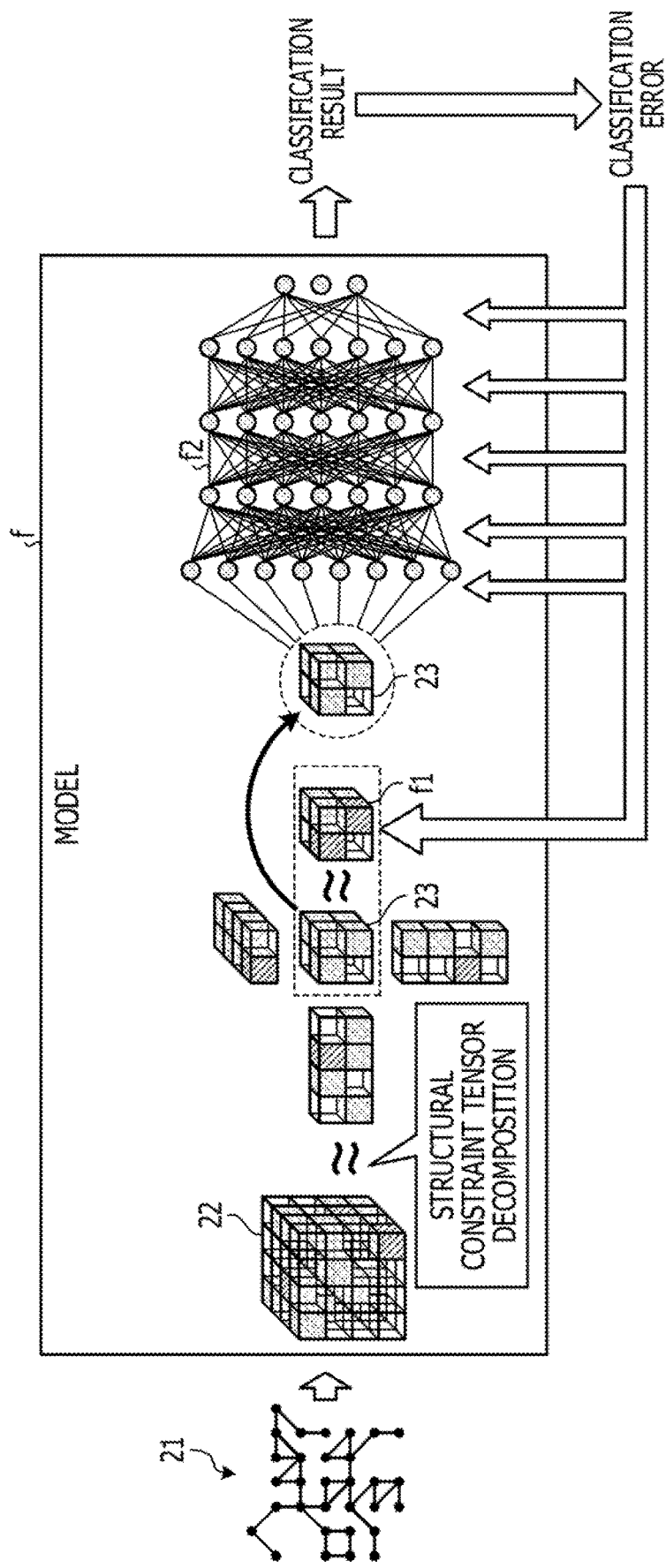
FIG. 3 is a diagram depicting an example of learning in deep tensor.

FIG. 3 is a diagram depicting an example of learning in deep tensor. As depicted in FIG. 3, in the deep tensor, graph data 21 to which correct answer labels are attached is inputted into the model f, the correct answer labels each indicating whether the future of the client corporation is promising or not. The model f into which the aforementioned graph data 21 is inputted decomposes the graph data 21 into a core tensor 23 and element matrices by performing structural constraint tensor decomposition using a target core tensor f1 and then inputs the core tensor 23 into a neural network f2. In the structural constraint tensor decomposition, the core tensor 23 is calculated such that a characteristic amount contributing to the classification is analogous to the expressed target core tensor f1.

In the deep tensor, the target core tensor f1 is learned in addition to the neural network f2 based on a classification error between a classification result outputted by the neural network f2 and the correct answer label. For example, various parameters of the neural network f2 are updated to reduce the classification error in such a way that the classification error is propagated to lower layers in an input layer, an intermediate layer, and an output layer included in the neural network f2 according to an extended backpropagation method which is an extension of the backpropagation method. The classification error is propagated to the target core tensor f1 and parameters of the target core tensor f1 are updated such that the classification error becomes close to the partial structure of the graph contributing to the classification. As a result, the neural network f2 and further the target core tensor f1 are optimized.

[Related Representative Example Extraction]

As described in the section of background, in the aforementioned related art, a small number of representative examples which are capable of obtaining output approximate to the output of the classifier to the maximum extent are extracted by using the LIME. The interpretable model corresponds to an example of an approximation model.

Figure 4:
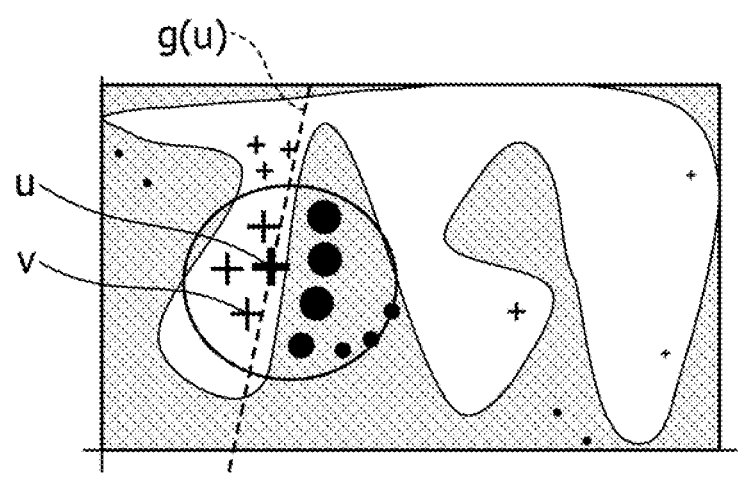
FIG. 4 is a diagram depicting an example of a method of generating an interpretable model.

For example, models g whose outputs are locally approximate to the output of the classifier f to be explained in the proximity of the data u are generated as interpretable models of the classifier f. FIG. 4 is a diagram depicting an example of a method of generating each interpretable model. In FIG. 4, as an example, a separation boundary of the classifier f for performing binary classification of class A and class B is modeled in a two-dimensional input space. A region of data which the classifier f classifies as class A out of classes A and B is whited out and a region of data which the classifier f classifies as class B is shaded. As depicted in FIG. 4, elements v in a neighborhood set V are sampled from a range in which distance d from data u in the input space is less than a threshold σ, for example a circular region in FIG. 4. Each of the elements v in the neighborhood set V and a classification result f(v) of v are set as learning data and the interpretable model g approximate to the classifier f in the proximity of the data u is learned.

Figure 5A:
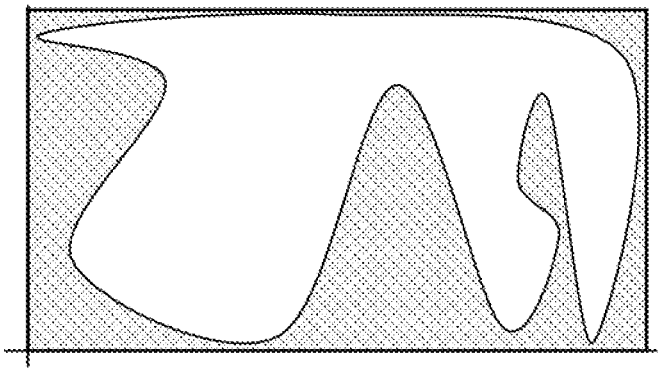
FIG. 5A is a diagram depicting an example of a separation boundary of a classifier.
Figure 5B:
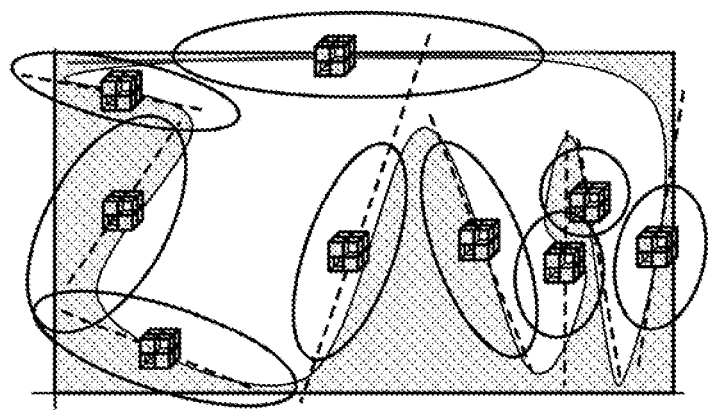
FIG. 5B is a diagram depicting an example of a model set of representative examples.
Figure 5C:
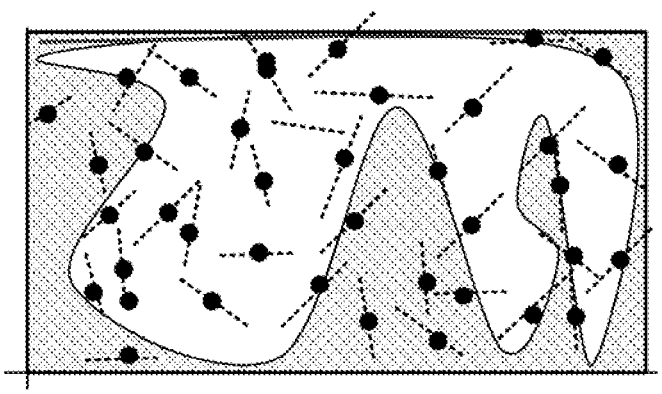
FIG. 5C is a diagram depicting an example of a set of interpretable models.

The more complex the classifier f to be explained is, the more the pieces of data u are for which the interpretable models g are generated. FIG 5A is a diagram depicting an example of a separation boundary of the classifier f. FIG. 5B is a diagram depicting an example of a model set of the representative examples. FIG. 5C is a diagram depicting an example of a set of interpretable models. In each of FIGS. 5B and 5C, pieces of data u to be exampled are depicted by symbols of tensors or circles and the representative examples or the interpretable models are depicted by broken lines. As depicted in FIG. 5A, the classifier f has a complex separation boundary. In this case, as depicted in FIG. 5C, a large number of interpretable models g are generated from an aspect of extracting the model set of the representative examples depicted in FIG. 5B.

In order to extract a small number of interpretable models with small errors with respect to the output of the classifier f as the representative examples from a large number of interpretable models g generated as described above, the aforementioned combinatorial optimization problem is formulated. For example, the combinatorial optimization problem of: similarity between the interpretable models g and pieces of reference data used for analysis of the classifier f; and output errors between the classifier f and the interpretable models g is solved to extract the model set of the representative examples. The pieces of reference data are an example of test data used for explanation function.

[Matrix used for Combinatorial Optimization Problem]

In the calculation of the combinatorial optimization problem as described above, a similarity matrix S and an error matrix E or an error amount matrix F are used. "Rows" in the similarity matrix S, the error matrix E, and the error amount matrix F indicate the pieces of reference data used for analysis of the classifier f to be explained and "columns" in these matrices indicate the interpretable models g. As a matter of course, the orders of the pieces of reference data and the interpretable models g are the same in the similarity matrix S, the error matrix E, and the error amount matrix F.

The similarity matrix S refers to a matrix including similarities between the pieces of reference data and the interpretable models as elements. For example, the similarity matrix S is generated by assigning a higher rank to the interpretable model more similar to each piece of the reference data. As an example, when the classifier f is a learned model learned by deep tensor, the similarity between the core tensor of each piece of reference data and the target core tensor of each interpretable model g is calculated. In this case, the smaller the value of the similarity is, the more similar the piece of reference data and the interpretable model are. The similarity being zero indicates that the reference data and the interpretable model are the same data.

The error amount matrix F is a matrix including, as elements, amounts of classification errors between the classification results obtained by classifying the pieces of reference data by using the interpretable models and the classification results obtained by classifying the pieces of reference data by using the classifier f to be explained. For example, when the classifier f is a learned model learned by deep tensor, the classification errors between the classification results obtained by classification using the classifier f and the classification results obtained by classification using the interpretable models are calculated as the error amounts. In the error amount matrix F, the smaller the value of the error amount is, the smaller the error of the interpretable model g approximated to the classifier f is.

The error matrix E is a matrix including, as elements, ranks assigned based on the amounts of classification errors between the classification results obtained by classifying the pieces of reference data by using the interpretable models and the classification results obtained by classifying the pieces of reference data by using the classifier f to be explained. For example, when the classifier f is a learned model learned by deep tensor, the interpretable model g with a greater classification error with respect to the classification result obtained by classification using the classifier f has a higher rank assigned thereto. In the error matrix E, the higher the rank of the interpretable model g is, the greater the error thereof is, and the lower the rank of the interpretable model g is, the smaller the error thereof is.

[One Aspect of Problems of Related Art]

The related art described above has a problem that the calculation cost for extracting the representative examples is great.

For example, the aforementioned combinatorial optimization problem is formulated as a set of $n^3+n^2+n$ simultaneous equations, where n is the number of interpretable models. Accordingly, the greater the number of the interpretable models is, the higher the calculation cost is. For example, when the classifier f is for deep learning, the interpretable model N are provided in a scale of 1000, 2000, or the like. Accordingly, even when a parallel calculator such as a GPU is used, a period required to calculate the solution of the combinatorial optimization problem is long in the order of several days.

[Reference Technique 1]

In Reference Technique 1, as an example of approximation algorithm, the greedy method is applied to the aforementioned similarity matrix S or the aforementioned error matrix E. For example, in Reference Technique 1, an interpretable model with similarity of high-ranks, for example, ranks "0" or "1" for many pieces of reference data is preferentially extracted according to the basics of the greedy method which is "keep the better". In Reference Technique 1, extraction of the representative examples continues until either of the following conditions is satisfied: a terminal condition 1 where the interpretable model whose ranks of similarity to all pieces of reference data are "0" or "1" is extracted; or a terminal condition 2 where a predetermined number of, for example, two models of representative examples are extracted. According to Reference Technique 1 described above, the calculation cost which is a set of $n^3+n^2+n$ simultaneous equations in the combinatorial optimization problem may be reduced to matrix operations as many as n×the number of pieces of reference data.

[One Aspect of Problem of Reference Technique 1]

However, in Reference Technique 1 described above, only the interpretable models which are highly rated from one viewpoint may be extracted as the representative examples. Thus, the interpretable models which are highly rated from multiple viewpoints may not be extracted as the representative examples in some cases. For example, when the greedy method is applied to the aforementioned similarity matrix S, the viewpoint of error is not considered in the extracted representative examples and, when the greedy method is applied to the aforementioned error matrix E, the viewpoint of similarity is not considered in the extracted representative examples.

Figure 6A:
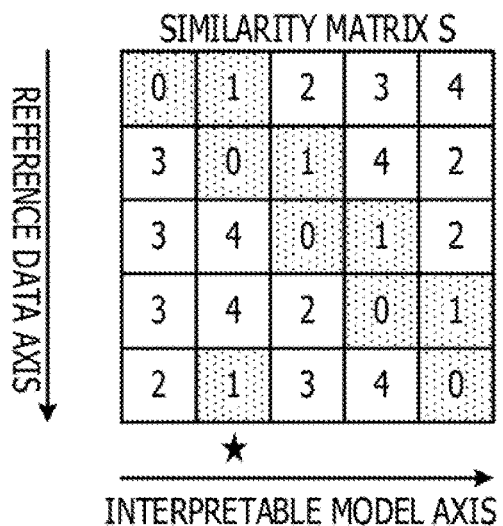
FIG. 6A is a diagram depicting an example of a similarity matrix.
Figure 6B:
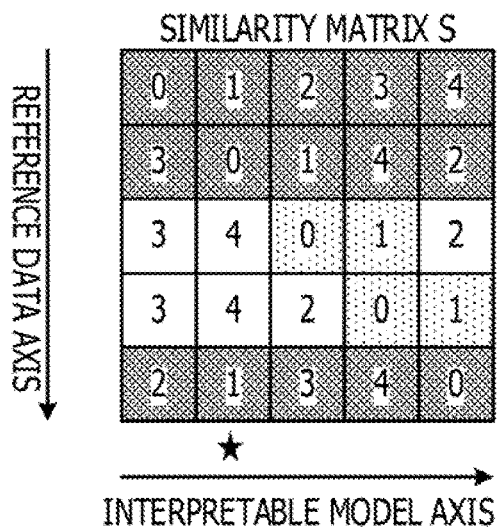
FIG. 6B is a diagram depicting an example of the similarity matrix.
Figure 6C:
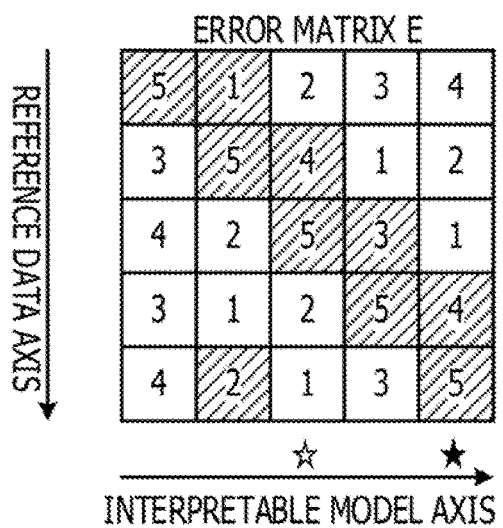
FIG. 6C is a diagram depicting an example of an error matrix.

The problems in the case where the greedy method is applied to the aforementioned similarity matrix S are described by using FIGS. 6A to 6C. Although FIGS. 6A to 6C describe a matrix with five rows and five columns as an example, the number of pieces of reference data and the number of interpretable models may be any numbers.

FIGS. 6A and 6B are diagrams depicting an example of the similarity matrix S. In FIGS. 6A and 6B, elements in which the ranks are "0" or "1" among the elements of the similarity matrix S are shaded by a dot pattern. As depicted in FIG. 6A, the interpretable models have the ranks of similarity of "0" or "1" to one, three, two, two, and two pieces of reference data, respectively, from the first column. In this case, the interpretable model ★ of the second column having the ranks of similarity of "0" or "1" for the most (three) pieces of reference data is extracted as the representative example. At this stage, since only one representative example is extracted, the extraction of the representative examples continues.

When the interpretable model ★ of the second column is extracted as described above, the numbers of pieces of reference data for which the ranks of similarity are "0" or "1" are referred to for the pieces of reference data for which the ranks of similarity are not "0" or "1" in the interpretable model ★ of the second column.

In FIG. 6B, rows of the pieces of reference data for which the ranks of similarity are "0" or "1" in the interpretable model ★ of the second column extracted as the representative example, for example, the first, second, and fifth rows of the similarity matrix S are darkly shaded. The numbers of pieces of reference data for which the ranks of similarity are "0" or "1" are referred to for the pieces of reference data of the third and fourth rows, excluding the pieces of reference data darkly shaded as described above, for example, the pieces of reference data of the first, second, and fifth rows.

As depicted in FIG. 6B, the number of pieces of reference data for which the ranks of similarity are "0" or "1" is as follows. For example, this number is zero in the interpretable model of the first column, one in the interpretable model of the third column, two in the interpretable model of the fourth column, and one in the interpretable model of the fifth column. In this case, the interpretable model ☆ of the fourth column having the ranks of similarity of "0" or "1" for the most (two) pieces of reference data is extracted as the representative example. As described above, since the number of representative examples reaches two which is an example of the predetermined number at the stage where the interpretable model ★ of the second column and the interpretable model ☆ of the fourth column are extracted, the extraction of the representative examples is terminated at this stage.

The interpretable model ★ of the second column and the interpretable model ☆ of the fourth column extracted as described above are highly rated in terms of similarity between the pieces of reference data and the interpretable models but may not be highly rated in terms of error.

FIG. 6C is a diagram depicting an example of the error matrix E. Elements corresponding to the elements in which the ranks of similarity are "0" or "1" in the similarity matrix S depicted FIG. 6A among the elements of the error matrix E depicted in FIG. 6C are shaded by diagonal lines.

As depicted in FIG. 6C, in the interpretable model of the second column, although the ranks of the similarity to the pieces of reference data of the first, second, and fifth rows are "0" or "1", the total of the error ranks in the pieces of reference data of the first second, and fifth rows is "8". In the interpretable model of the fourth column, although the ranks of the similarity to the pieces of reference data of the third and fourth rows are "0" or "1", the total of the error ranks in the pieces of reference data of the third and fourth rows is "8".

Compared to the interpretable models of the second and fourth columns, in the interpretable model of the third column, the total of the error ranks in the pieces of reference data of the second and third rows for which the ranks of similarity are "0" or "1" is "9". In the interpretable model of the fifth column, the total of the error ranks in the pieces of reference data of the fourth and fifth rows for which the ranks of similarity are "0" or "1" is "9".

As described above, in terms of error, the interpretable models of the second and fourth columns are rated lower than the interpretable models of the third and fifth columns. Accordingly, from the viewpoints of both of similarity and error, it is better to extract the interpretable models of the third and fifth columns denoted by the symbols of ☆ and ★ in FIG. 6C as the representative examples than to extract the interpretable models of the second and fourth columns denoted by the symbols of ☆ and ★ in FIG. 6B.

[Reference Technique 2]

In Reference Technique 2, the greedy method is applied to one of the similarity matrix S and the error matrix E to narrow down the elements in which the error ranks or similarity are referred to in the other one of the similarity matrix S and the error matrix E and the interpretable models with highly-rated total values of the error ranks or the similarity are extracted as the representative examples. For example, in Reference Technique 2, the interpretable model with the highest total of error ranks for the pieces of reference data for which the ranks of similarity are high ranks of "0" or "1" is preferentially extracted. Also in Reference Technique 2, the extraction of the representative examples continues until either of the following conditions is satisfied: the terminal condition 1 where the interpretable model whose rank of similarity to all pieces of reference data are "0" or "1" is extracted; or the terminal condition 2 where a predetermined number of, for example, two models of representative examples are extracted. According to Reference Technique 2 described above, it is possible to reduce the calculation cost to matrix operations as many as n×the number of pieces of reference data as in Reference Technique 1 and to improve the extraction accuracy of the representative examples from that of Reference Technique 1.

An example of a method of extracting the representative examples in Reference Technique 2 is described by using FIGS. 7A and 7F. FIGS. 7A and 7D are diagrams depicting an example of the similarity matrix S. FIGS. 7B and 7E are diagrams depicting an example of the error matrix E. FIGS. 7C and 7F are diagrams depicting an example of the total values of the error ranks. A process in which the first interpretable model is extracted is described by using FIGS. 7A to 7C among FIGS. 7A to 7F and a process in which the second interpretable model is extracted is described by using FIGS. 7D to 7F. The similarity matrix S depicted in FIGS. 7A and 7D is the same as the similarity matrix s depicted in FIGS. 6A and 6B and the error matrix E depicted in FIGS. 7B and 7E is the same as the error matrix E depicted in FIG. 6C.

First, as depicted in FIG. 7A, elements in which the ranks of similarity are "0" or "1", for example, elements shaded by a dot pattern among the elements of the similarity matrix S are identified. Next, as depicted in FIG. 7B, the error ranks in elements corresponding to the elements identified to have the ranks of similarity of "0" or "1" in the similarity matrix S, for example, elements shaded by diagonal lines among the elements of the error matrix E and the error ranks in the other elements are separately added up for each interpretable model.

As depicted in FIG. 7C, the total value of the error ranks of each interpretable model for the pieces of reference data for which the interpretable model has high ranks of similarity of "0" or "1" is obtained and the total values in the interpretable models are "5", "8", "9", "8", and "9", respectively, from the first column. For example, in the interpretable model of the first column, the error rank "5" in the element of the first row shaded by diagonal lines in the first column of the error matrix of FIG. 7B is set as the total value of the error rank as it is. In the example of the interpretable model of the second column, the error ranks "1", "5", and "2" in the elements of the first, second, and fifth rows shaded by diagonal lines in the second column of the error matrix of FIG. 7B are added up and the total value of the error ranks is set to "8". Also in the interpretable models of the following third to fifth columns, the total values of the error ranks for the pieces reference data for which the ranks of similarity are high are obtained by similar calculation.

As depicted in FIG. 7C, the total value of the error ranks of each interpretable model for the pieces of reference data for which the ranks of the similarity of the interpretable model are low ranks less than "2" is obtained and the total values in the interpretable models are "14", "3", "5", "7", and "7", respectively, from the first column. For example, in the example of the interpretable model of the first column, the error ranks "3", "4", "3", and "4" in the elements of the second to fifth rows not shaded by diagonal lines in the first column of the error matrix of FIG. 7B are added up and the total value of the error ranks is set to "14". In the example of the interpretable model of the second column, the error ranks "2" and "1" in the elements of the third and fourth rows not shaded by diagonal lines in the second column of the error matrix of FIG. 7B are added up and the total value of the error ranks is set to "3". Also in the interpretable models of the following third to fifth columns, the total values of the error ranks for the pieces reference data for which the ranks of similarity are low are obtained by similar calculation.

The interpretable model with the greatest total value of the error ranks for the pieces of reference data for which the ranks of similarity are high is extracted. For example, in the example of FIG. 7C, the two interpretable models of the third and fifth columns in which the greatest total value of "9" is observed are extracted. When the greatest total value is observed in multiple interpretable models as described above, the interpretable model in which the total value of the error ranks for the pieces of the reference data for which the ranks of similarity are low is the greatest is further extracted. For example, in the example of FIG. 7C, the total value of the error ranks for the pieces of the reference data for which the ranks of similarity are low is "7" in the interpretable model of the fifth column and the total value of the error ranks for the pieces of the reference data for which the ranks of similarity are low is "5" in the interpretable model of the third column. Accordingly, the interpretable model ★ of the fifth column in which the greatest total value of "7" is observed out of the two interpretable models of the third and fifth columns is extracted as the representative example.

At this stage, the interpretable model whose ranks of similarity are high ranks of "0" and "1" only for the pieces of reference data of the fourth and fifth rows is extracted and the number of the representative examples has not reached the predetermined number "2". Accordingly, the extraction of the representative examples continues.

When the interpretable model of the fifth column is extracted as described above, the numbers of pieces of reference data for which the ranks of similarity are high ranks of "0" or "1" are referred to for the pieces of reference data for which the ranks of similarity are not high ranks of "0" or "1" in the interpretable model of the fifth column.

In FIG. 7D, rows of the pieces of the reference data for which the ranks of similarity are high ranks of "0" or "1" in the interpretable model of the fifth column extracted as the representative example, for example, the fourth and fifth rows of the similarity matrix S are darkly shaded. In FIG. 7D, the column of the interpretable model which has been already extracted as the representative example, for example, the fifth column of the similarity matrix S is darkly shaded. The elements in which the ranks of similarity are high ranks of "0" or "1", for example, the, elements shaded by a dot pattern are identified in the remaining elements of the similarity matrix S, excluding the darkly-shaded elements.

Then, as depicted in FIG. 7E, the error ranks in the elements corresponding to the elements identified to have the high ranks of similarity of "0" or "1" in the similarity matrix S depicted in FIG. 7D, for example, the elements shaded by diagonal lines among the elements of the remaining error matrix E excluding the darkly-shaded elements and the error ranks in the other elements are separately added up for each interpretable model.

As depicted in FIG. 7F, the total value of the error ranks of each interpretable model for the pieces of reference data for which the ranks of the similarity of the interpretable model are high ranks of "0" or "1" is obtained and the total values in the respective interpretable models are "5", "6", "9", and "3", respectively, from the first column. For example, in the interpretable model of the first column, the error rank "5" in the element of the first row shaded by diagonal lines in the first column of the error matrix of FIG. 7E is set as the total value of the error rank as it is. In the example of the interpretable model of the second column, the error ranks "1" and "5" in the elements of the first and second rows shaded by diagonal lines in the second column of the error matrix of FIG. 7E are added up and the total value of the error ranks is set to "6". Also in the interpretable models of the following third and fourth columns, the total values of the error ranks for the pieces reference data for which the ranks of similarity are high are obtained by similar calculation.

As depicted in FIG. 7F, the total value of the error ranks of each interpretable model for the pieces of reference data for which the ranks of the similarity of the interpretable model are low ranks less than "2" is obtained and the total values in the interpretable models are "7", "2", "2", and "4", respectively, from the first column. For example, in the example of the interpretable model of the first column, the error ranks "3" and "4" in the elements of the second and third rows not shaded by diagonal lines in the first column of the error matrix of FIG. 7E are added up and the total value of the error ranks is set to "7". In the example of the interpretable model of the second column, the error rank "2" in the element of the third row not shaded by diagonal lines in the second column of the error matrix of FIG. 7E is set as the total value of the error rank as it is. Also in the interpretable models of the following third and fourth columns, the total values of the error ranks for the pieces reference data for which the ranks of similarity are low are obtained by similar calculation.

The interpretable model with the greatest total value of the error ranks for the pieces of reference data for which the ranks of similarity are high is extracted. For example, in the example of FIG. 7F, the interpretable model ☆ of the third column in which the greatest total value of "9" is observed is extracted as the representative example.

As described above, in Reference Technique 2, the interpretable models are extracted from viewpoints of both of similarity and error and the interpretable models of the third and fifth columns which are not extracted in Reference Technique 1 may be extracted as the representative examples. Accordingly, in Reference Technique 2, it is possible to improve the extraction accuracy of the representative examples from that in Reference Technique 1.

[One Aspect of Problem of Reference Technique 2]

However, in Reference Technique 2 described above, there may occur the case where an optimal solution for one of the error matrix E and the similarity matrix S is left out when the greedy method is applied to the other one of the similarity matrix S and the error matrix E and the extraction accuracy of the representative example decreases.

The case where the optimal solution for the error matrix E is left out when the greedy method is applied to the similarity matrix S is described by using FIGS. 8A and 8B. FIGS. 8A and 8B are diagrams depicting the case where the optimal solution is left out. Among these drawings, FIG. 8A depicts the case where the greedy method is applied to the similarity matrix S by using Reference Technique 2 and FIG. 8B depicts an example of the optimal solution left out in Reference Technique 2.

As depicted in FIG. 8A, in Reference Technique 2, elements in which the ranks of similarity are "0" or "1", for example, elements shaded by a dotted pattern among the elements of the similarity matrix S are identified. Next, in Reference Technique 2, the error ranks of elements corresponding to the elements identified to have the ranks of similarity of "0" or "1" in the similarity matrix S, for example, elements shaded by diagonal lines among the elements of the error matrix E and the error ranks of the other elements are separately added up for each column of interpretable model. As a result, in Reference Technique 2, the interpretable model of the first column with the greatest total value of "12" among the total values of the error ranks for the pieces of reference data for which the ranks of similarity are high is extracted as the representative example.

However, in Reference Technique 2, elements other than the elements identified to have the high ranks of similarity of "0" or "1" in the similarity matrix S are omitted by the greedy method. Accordingly, when the elements omitted in the similarity matrix S include elements in which the error ranks are low in the error matrix E, for example, elements in which the values of error ranks are large, the optimal solution is left out in the error matrix E.

In FIG. 8B, elements contributing to the optimal solution in the error matrix E among the elements omitted due to application of the greedy method to the similarity matrix S are shaded by vertical lines. FIG. 8B depicts an example in which the error ranks in the elements shaded by the vertical lines are added up together with the error ranks in the elements shaded by the diagonal lines, under the assumption that the interpretable model of the first column is not extracted as the representative example. In this case, the total values obtained by adding up the error ranks in the elements shaded by the diagonal lines and the vertical lines among the total values of the error ranks are "12", "16", "16", and "*", respectively, from the interpretable model of the first column.

As described above, the interpretable model in which the greatest total value is observed changes from the interpretable model of the first column to the interpretable models of the second and third columns by setting the elements shaded by the vertical lines in the error matrix E as the targets of adding up of the error ranks. Meanwhile, there is almost no difference in similarity between the case where the interpretable model of the first column is extracted and the case where the interpretable models of the second and third columns are extracted. For example, regarding the pieces of reference data from the third to the sixth rows to which the elements shaded by the vertical lines belong, in the comparison of the ranks of similarity in the similarity matrix S between the first case and the second case, the rank of similarity varies only by one in each of the third to the sixth rows. This means that the interpretable models of the second and third columns which are the optimal solutions are left out when the greedy method is applied to the similarity matrix S, due to omission of the error ranks in the elements shaded by the vertical lines in the error matrix E from the targets of adding up.

[One Aspect of Approach for Solving Problems in Related Art and Reference Techniques 1 and 2]

In the embodiment, an elimination greedy method is used in which a viewpoint of elimination method which is "preferentially delete the less required" is added to the idea of the greedy method which is "keep the better".

For example, in the elimination greedy method, for each of the multiple interpretable models locally approximated to the classifier to be explained, a second-most-similar interpretable model which is most similar to test data after the interpretable model is determined, the test data being most similar to the interpretable model, the interpretable model with the smallest difference in the classification error to the second-most-similar interpretable mode is excluded, and the remaining interpretable model is outputted as the representative example. Details of an algorithm of the elimination greedy method are described later by using FIGS. 9A to 15.

Excluding the interpretable model with the smallest difference in the classification error to the second-most-similar interpretable model increases the possibility that an interpretable model whose exclusion has a large impact is kept to the end. As a result, this suppresses occurrence of the case where an optimal solution for one of the error matrix E and the similarity matrix S is left out when the greedy method is applied to the other one of the similarity matrix S and the error matrix E as in the application of the normal greedy method.

Thus, according to the elimination greedy method, it is possible to reduce the calculation cost to matrix operations as many as n×the number of pieces of reference data as in Reference Techniques 1 and 2 and to also improve the extraction accuracy of the representative examples from those of related art and Reference Techniques 1 and 2.

[Configuration of Model Output Device 10]

As depicted in FIG. 1, the model output device 10 includes a learner 11, a generator 13, a first calculator 15, a second calculator 16, a determiner 17, an excluder 18, and an output unit 19. In addition to the functional units depicted in FIG. 1, the model output device 10 may include various functional units that known computers include, such as various input devices and various audio output devices as well as a functional unit corresponding to an interface which performs communication with an external device.

The functional units such as the learner 11, the generator 13, the first calculator 15, the second calculator 16, the determiner 17, the excluder 18, and the output unit 19 depicted in FIG. 1 are given for illustration purpose and may be implemented virtually by the following hardware processor. Examples of the processor include a central processing unit (CPU) and a microprocessor unit (MPU) in addition to general-purpose computing on graphics processing units (GPGPU) and the GPU cluster. For example, the processor loads a model output program which implements Reference Technique 1, Reference Technique 2, or the elimination greedy method as a process on a memory such as a random-access memory (RAM) to virtually implement the aforementioned functional units. Although the GPGPU, the GPU cluster, the CPU, and the MPU are described as examples of the processor, the functional units may be implemented by any processor regardless of whether the processor is a general-purpose type or a special type. In addition, the functional units described above may be implemented by a hard wired logic circuit such as an application specific integrated circuit (ASIC) or a field-programmable gate array (FPGA).

Various pieces of data such as learning data 11A, reference data 11B, a learning model 12, and an interpretable model 14 depicted in FIG. 1 are stored in storage such as a hard disk drive (HDD), an optical disc, or a solid state drive (SSD) which are examples. The aforementioned pieces of data do not have to be stored in the storage and may be stored in a semiconductor memory element such as, for example, a RAM, an electrically erasable programmable read-only memory (EEPROM), or a flash memory.

The learner 11 is a processor which learns a classifier by using the learning data 11A.

In an embodiment, the learner 11 reads the learning data 11A from the not-depicted storage. For example, the learning data 11A corresponds to a data set of learning samples to which correct answer labels are attached for each of the original data depicted in FIG. 2A and the graph data depicted in FIG. 2B. The learner 11 executes the tensorization of the graph data, the structural constraint tensor decomposition using the target core tensor f1, the input of the core tensor into the neural network f2, and the update of the parameters of the target core tensor f1 and the neural network f2 by the extended backpropagation method, for each learning sample included in the learning data 11A. The learned model in which the neural network f2 and the target core tensor f1 are optimized is thereby obtained. The learned model obtained as described above is stored in the storage as the learning model 12.

The generator 13 is a processor which generates the aforementioned interpretable model 14. As an example, description is given of the case where the learning model 12 is used as the classifier f to be explained.

In an embodiment, the generator 13 is capable of generating the interpretable model at any time after the generation of the learning model 12 by the learner 11. For example, the generator 13 generates, as the interpretable model, models g whose outputs are locally approximate to the output of the learning model 12 in the proximity of the data u as interpretable models, according to the algorithm of LIME. For example, this interpretable model may be generated in the way explained in FIG. 5C from the aspect of using the interpretable model as the candidate of the representative examples depicted in FIG. 5B. Multiple interpretable models are obtained as described above and stored in the storage as the interpretable model 14.

The first calculator 15 is a processor which calculates the similarity between the pieces of reference data and the interpretable models.

In an embodiment, the first calculator 15 is capable of calculating the aforementioned similarity at any time after the generation of the interpretable model 14 by the generator 13. For example, the first calculator 15 reads the reference data 11B and the interpretable model 14 from the not-depicted storage. For example, the data set of reference data such as the original data depicted in FIG. 2A or the graph data depicted in FIG. 2B corresponds to the reference data 11B out of the read pieces of data. It is assumed that data different from the learning samples included in the learning data 11A is used as the "reference data" described herein. For example, it is possible to use part of a data set provided by a subscriber subscribing to a machine learning service of the learning model 12 as the learning data 11A and use the rest as the reference data 11B.

The first calculator 15 calculates the aforementioned similarity for all combinations of the pieces of reference data included in the reference data 11B and the interpretable models included in the interpretable model 14. For example, the first calculator 15 calculates similarity such as an inner product or a cosine similarity between the core tensor of each piece of reference data and the target core tensor of each interpretable model. For each piece of reference data, the first calculator 15 assigns a lower rank to the interpretable model more similar to the reference data. The similarity matrix S is thereby generated.

The second calculator 16 is a processor which calculates the classification error of the reference data between the learning model and each interpretable model.

In an embodiment, the second calculator 16 is capable of calculating the aforementioned classification errors at any time after the generation of the interpretable model 14 by the generator 13. For example, the second calculator 16 calculates the aforementioned classification errors for all combinations of the pieces of reference data included in the reference data 11B and the interpretable models included in the interpretable model 14. For example, the second calculator 16 calculates a difference between a certainty of a label outputted by the learning model 12 as a classification result of each piece of reference data and a certainty of a label outputted by each interpretable model as the classification result of the reference data as the error amount. The error amount matrix F and the error matrix E are thereby generated.

The determiner 17 calculates, for each interpretable model, a degree of classification error at which the other interpretable models are affected when the interpretable model is excluded, as a degree of impact. The determiner 17 corresponds to an example of a first determiner and a second determiner.

In an embodiment, the determiner 17 is capable of calculating the aforementioned degree of impact at any time after the calculation of the similarity by the first calculator 15 and the calculation of the classification errors by the second calculator 16. For example, the determiner 17 selects one of unselected interpretable models among the multiple interpretable models included in the interpretable model 14. Next, the determiner 17 refers to the aforementioned similarity matrix S and determines the piece of reference data with the highest similarity to the selected interpretable model. The determiner 17 determines the second-most-similar interpretable model with the second highest similarity to the previously-determined reference data after the selected interpretable model. The determiner 17 calculates the degree of impact of the selected interpretable model based on the error amount of the selected interpretable model and the error amount of the second-most-similar interpretable model.

The excluder 18 is a processor which excludes the interpretable model with the smallest degree of impact among the multiple interpretable models.

In an embodiment, the excluder 18 excludes the interpretable model with the smallest degree of impact among the multiple interpretable models when the determiner 17 calculates the degrees of impact for all interpretable models. Thereafter, the excluder 18 repeats the processing of excluding the interpretable model with the smallest degree of impact until the number of the interpretable models remaining after the exclusion reaches a predetermined number while causing the determiner 17 to execute the processing of calculating the degrees of impact for the remaining interpretable models.

The output unit 19 is a processor which outputs the interpretable models as the representative examples.

In an embodiment, when the number of the remaining interpretable models reaches the predetermined number as a result of the exclusion by the excluder 18, the output unit 19 outputs the remaining interpretable models to a predetermined output destination. Examples of the output destination include a module which analyzes elements greatly contributing to the classification in the interpretable models, for example, a neuron in which a weight or a bias exceeds a threshold in the neural network f2 or a partial structure in which a density exceeds a threshold in the graph data inputted as the reference data. Displaying the output of such a module may assist creation of a report explaining why the classification results are obtained and the grounds for the classification results.

[Operation Example of Elimination Greedy Method]

Figures 9A, 9B:
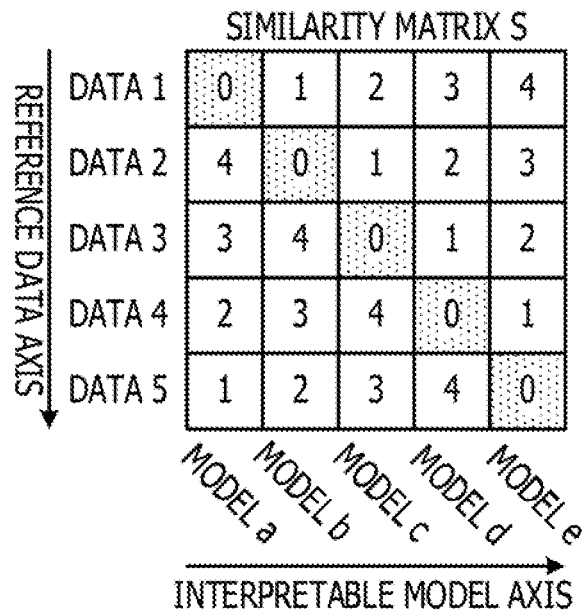
FIG. 9A is a diagram depicting an example of the similarity matrix.
FIG. 9B is a diagram depicting an example of an error amount matrix.

Next, an operation example of the elimination greedy method is described by using FIGS. 9A to 12B. FIG. 9A is a diagram depicting an example of the similarity matrix S. FIG. 9B is a diagram depicting an example of the error amount matrix F.

Description is given of an operation example of the case where the similarity matrix S and the error amount matrix F each with five rows and five columns are used as depicted in FIGS. 9A and 9B. "Rows" in the similarity matrix S depicted in FIG. 9A and the error amount matrix F depicted in FIG. 9B indicate the pieces of reference data used for analysis of the classifier f to be explained and "columns" indicate the interpretable models g. In the similarity matrix S depicted in FIG. 9A and the error amount matrix F depicted in FIG. 9B, the pieces of reference data of the first row to the fifth row are referred to as data 1 to data 5, respectively and the interpretable models of the first column to the fifth column are referred to as model a to model e, respectively.

Figure 10C:
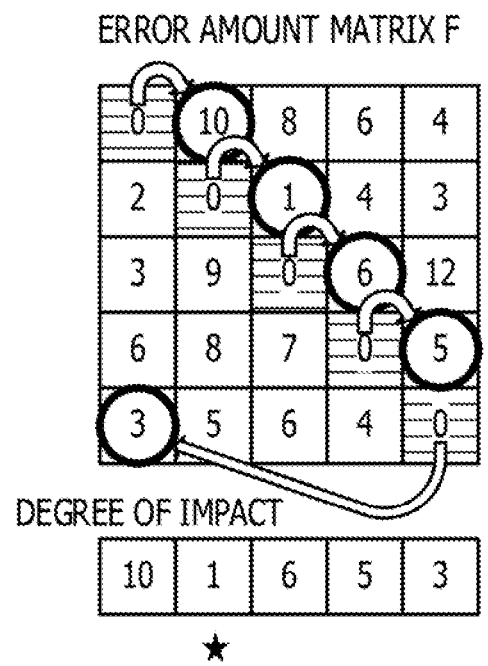
FIG. 10C is a diagram depicting an example of the error amount matrix.
Figure 10D:
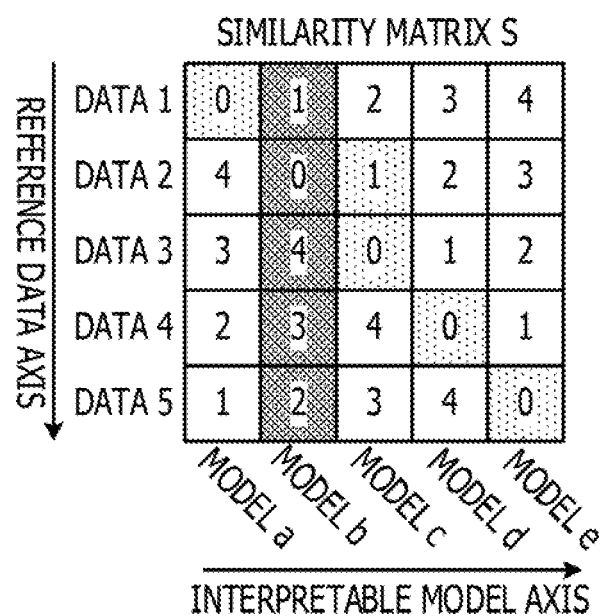
FIG. 10D is a diagram depicting an example of the similarity matrix.
Figures 11A, 11B:
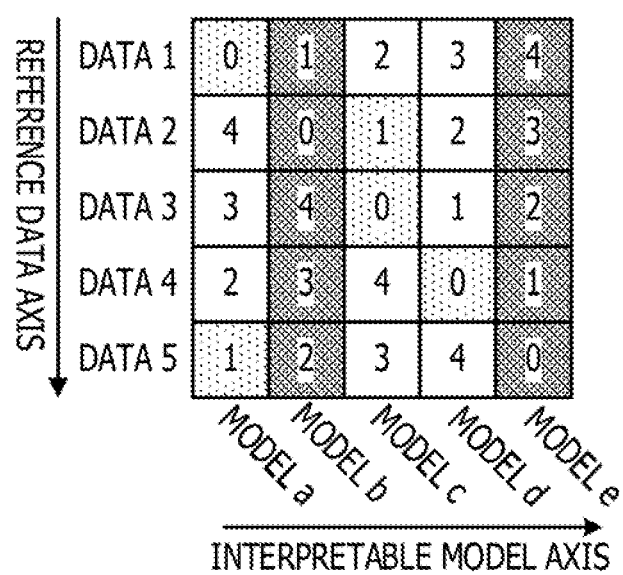
FIG. 11A is a diagram depicting an example of the error amount matrix.
FIG. 11B is a diagram depicting an example of the sim y matrix.

FIGS. 10A, 10D, 11B, and 12B are diagrams depicting an example of the similarity matrix S. FIGS. 10B, 10C, 11A, and 12A are diagrams depicting an example of the error amount matrix F. FIGS. 10A to 10D among the drawings of FIGS. 10A to 12B are used to explain the process of excluding the first interpretable model, FIGS. 11A and 11B are used to explain the process of excluding the second interpretable model, and then FIGS. 12A and 12B are used to explain the process of excluding the third interpretable model.

First, one of the interpretable models included in the similarity matrix S depicted in FIG. 9A is selected to select the interpretable model whose exclusion is to be considered, for example, the interpretable model whose degree of impact is to be calculated. FIG. 10A depicts an example in which the model a among the models a to e depicted in FIG. 9A is selected and the first column corresponding to the selected model a is darkly shaded.

When the selected interpretable model is the model a as described above, the similarity included in each element in the first column of the similarity matrix S depicted in FIG. 10A is referred to and the data 1 with the highest similarity to the model a is determined. The second-most-similar model b with the similarity of "1" to the previously-determined data 1 which is the second highest after the similarity of "0" of the selected model a is determined.

Then, the error amount matrix F is referred to and the degree of impact of exclusion of the model a is calculated based on the error amount of the selected model a and the error amount of the second-most-similar model b. In FIG. 10B, the element of the first row, first column of the error amount matrix F which corresponds to the data 1 among the elements of the selected model a and the element of the first row, second column of the error amount matrix F which corresponds to the data 1 among the elements of the second-most-similar model b are depicted to be surrounded by an ellipse. The difference between the error amount in the element of the first row, first column of the error amount matrix F and the error amount in the element of the first row, second column of the error amount matrix F is calculated and the degree of impact of the exclusion of the model a is calculated as "10 (=10−0)".

Thereafter, the calculation of the degree of impact is repeated until all interpretable models included in the similarity matrix S are selected.

For example, when the model b is selected as the interpretable model whose exclusion is to be considered, the similarity included in each element in the second column of the similarity matrix S depicted in FIG. 10A is referred to and the data 2 with the highest similarity to the model b is determined. The second-most-similar model c with the similarity of "1" to the previously-determined data 2 which is the second highest after the similarity of "0" of the selected model b is determined. As depicted in FIG. 10C, the difference between the error amount in the element of the second row, second column of the error amount matrix F which corresponds to the data 2 among the elements of the selected model b and the error amount in the element of the second row, third column of the error amount matrix F which corresponds to the data 2 among the elements of the second-most-similar model c is calculated and the degree of impact of the exclusion of the model b is calculated as "1 (=1−0)".

Next, when the model c is selected as the interpretable model whose exclusion is to be considered, the similarity included in each element in the third column of the similarity matrix S depicted in FIG. 10A is referred to and the data 3 with the highest similarity to the model c is determined. The second-most-similar model d with the similarity of "1" to the previously-determined data 3 which is the second highest after the similarity of "0" of the selected model c is determined. As depicted in FIG. 10C, the difference between the error amount in the element of the third row, third column of the error amount matrix F which corresponds to the data 3 among the elements of the selected model c and the error amount in the element of the third row, fourth column of the error amount matrix F which corresponds to the data 3 among the elements of the second-most-similar model d is calculated and the degree of impact of the exclusion of the model c is calculated as "6 (=6–0)".

Next, when the model d is selected as the interpretable model whose exclusion is to be considered, the similarity included in each element in the fourth column of the similarity matrix S depicted in FIG. 10A is referred to and the data 4 with the highest similarity to the model d is determined. The second-most-similar model e with the similarity of "1" to the previously-determined data 4 which is the second highest after the similarity of "0" of the selected model d is determined. As depicted in FIG. 10C, the difference between the error amount in the element of the fourth row, fourth column of the error amount matrix F which corresponds to the data 4 among the elements of the selected model d and the error amount in the element of the fourth row, fifth column of the error amount matrix F which corresponds to the data 4 among the elements of the second-most-similar model e is calculated and the degree of impact of the exclusion of the model d is calculated as "5 (=5–0)".

Next, when the model e is selected as the interpretable model whose exclusion is to be considered, the similarity included in each element in the fifth column of the similarity matrix S depicted in FIG. 10A is referred to and the data 5 with the highest similarity to the model e is determined. The second-most-similar model a with the similarity of "1" to the previously-determined data 5 which is the second highest after the similarity of "0" of the selected model e is determined. As depicted in FIG. 10C, the difference between the error amount in the element of the fifth row, fifth column of the error amount matrix F which corresponds to the data 5 among the elements of the selected model e and the error amount in the element of the fifth row, first column of the error amount matrix F which corresponds to the data 5 among the elements of the second-most-similar model a is calculated and the degree of impact of the exclusion of the model e is calculated as "3 (=3–0)".

When the degrees of impact of all models a to e are calculated as described above, as depicted in FIG. 10D, exclusion of the model b whose degree of impact is calculated to be the smallest among the models a to e, for example, the darkly-shaded second column is determined. With the exclusion of the model b, in the classification of the data 2 having the highest similarity to the excluded model b, from the aspect of substituting the model b with the model c having the second highest similarity to the data 2 after the model b, the data 2 is imitated as data with the highest similarity to the model c.

In this stage, four models of the model a and models c to e remain as a result of the exclusion of the model b and the number of the interpretable models is not reduced to "2" which is the predetermined number. Accordingly, the exclusion of the second interpretable model is started.

When the model a is selected as the interpretable model whose exclusion is to be considered among the four models of the model a and models c to e, the similarity included in each element in the first column of the similarity matrix S depicted in FIG. 10D is referred to and the data 1 with the highest similarity to the model a is determined. The second-most-similar model c with the similarity of "2" to the previously-determined data 1 which is the second highest after the similarity of "0" of the selected model a is determined. In this case, the excluded model c is ignored as a matter of course. As depicted in FIG. 11A, the difference between the error amount in the element of the first row, first column of the error amount matrix F which corresponds to the data 1 among the elements of the selected model a and the error amount in the element of the first row, third column of the error amount matrix F which corresponds to the data 1 among the elements of the second-most-similar model c is calculated and the degree of impact of the exclusion of the model a is calculated as "8 (=8–0)".

Next, when the model c is selected as the interpretable model whose exclusion is to be considered among the four models of the model a and models c to e, the similarity included in each element in the third column of the similarity matrix S depicted in FIG. 10D is referred to and the data 3 with the highest similarity to the model c is determined. The second-most-similar model d with the similarity of "1" to the previously-determined data 3 which is the second highest after the similarity of "0" of the selected model c is determined. As depicted in FIG. 11A, there is calculated the difference "6 (=6–0)" between the error amount in the element of the third row, third column of the error amount matrix F which corresponds to the data 3 among the elements of the selected model c and the error amount in the element of the third row, fourth column of the error amount matrix F which corresponds to the data 3 among the elements of the second-most-similar model d.

Since the model c is a substitution model of the model b regarding the data 2, the data 2 imitated as the data with the highest similarity to the model c is further determined. The second-most-similar model d with the similarity of "2" to the previously-determined data 2 which is the second highest after the similarity of "1" of the selected model c is determined. As depicted in FIG. 11A, there is calculated the difference "3 (=4–1)" between the error amount in the element of the second row, third column of the error amount matrix F which corresponds to the data 2 among the elements of the selected model c and the element of the second row, fourth column of the error amount matrix F which corresponds to the data 2 among the elements of the second-most-similar model d.

These differences in the error amounts are added up and the degree of impact of the exclusion of the model c is calculated as "9 (=6+3)".

Next, when the model d is selected as the interpretable model whose exclusion is to be considered among the four models of the model a and models c to e, the similarity included in each element in the fourth column of the similarity matrix S depicted in FIG. 10D is referred to and the data 4 with the highest similarity to the model d is determined. The second-most-similar model e with the similarity of "1" to the previously-determined data 4 which is the second highest after the similarity of "0" of the selected model d is determined. As depicted in FIG. 11A, the difference between the error amount in the element of the fourth row, fourth column of the error amount matrix F which corresponds to the data 4 among the elements of the selected model d and the error amount in the element of the fourth row, fifth column of the error amount matrix F which corresponds to the data 4 among the elements of the second-most-similar model e is calculated and the degree of impact of the exclusion of the model d is calculated as "5 (=5−0)".

Next, when the model e is selected as the interpretable model whose exclusion is to be considered among the four models of the model a and models c to e, the similarity included in each element in the fifth column of the similarity matrix S depicted in FIG. 10D is referred to and the data 5 with the highest similarity to the model e is determined. The second-most-similar model a with the similarity of "1" to the previously-determined data 5 which is the second highest after the similarity of "0" of the selected model e is determined. As depicted in FIG. 11A, the difference between the error amount in the element of the fifth row, fifth column of the error amount matrix F which corresponds to the data 5 among the elements of the selected model e and the error amount in the element of the fifth row, first column of the error amount matrix F which corresponds to the data 5 among the elements, of the second-most-similar model a is calculated and the degree of impact of the exclusion of the model d is calculated as "3 (=3−0)".

When the degrees of impact of the four models of the model a and models c to e are calculated as described above, as depicted in FIG. 11B, exclusion of the model e whose degree of impact is calculated to be the smallest among the four models of the model a and models c to e, for example, the darkly-shaded fifth column is determined.

In this stage, three models of the models a, c, and d remain as a result of the exclusion of the model e and the number of the interpretable models is not reduced to "2" which is the predetermined number. Accordingly, the exclusion of the third interpretable model is started. With the exclusion of the model e, in the classification of the data 5 having the highest similarity to the excluded model e, from the aspect of substituting the model e with the model a having the second highest similarity to the data 5 after the model d, the data 5 is imitated as data with the highest similarity to the model a.

When the model a is selected as the interpretable model whose exclusion is to be considered among the three models of the models a, c, and d, the similarity included in each element in the first column of the similarity matrix S depicted in FIG. 11B is referred to and the data 1 with the highest similarity to the model a is determined. The second-most-similar model c with the similarity of "2" to the previously-determined data 1 which is the second highest after the similarity of "0" of the selected model a is determined. In this case, the excluded model c is ignored as a matter of course. As depicted in FIG. 12A, there is calculated the difference "8 (=8−0)" between the error amount in the element of the first row, first column of the error amount matrix F which corresponds to the data 1 among the elements of the selected model a and the error amount in the element of the first row, third column of the error amount matrix F which corresponds to the data 1 among the elements of the second-most-similar model c.

Since the model a is a substation model of the model e regarding the data 5, the data 5 imitated as the data with the highest similarity to the model a is further determined. The second-most-similar model c with the similarity of "3" to the previously-determined data 5 which is the second highest after the similarity of "1" of the selected model a is determined. As depicted in FIG. 12A, there is calculated the difference "3 (=6−3)" between the error amount in the element of the fifth row, first column of the error amount matrix F which corresponds to the data 5 among the elements of the selected model a and the error amount in the element of the fifth row, third column of the error amount matrix F which corresponds to the data 5 among the elements of the second-most-similar model c.

These differences in the error amounts are added up and the degree of impact of the exclusion of the model a is calculated as "11 (=8+3)".

Next, when the model c is selected as the interpretable model whose exclusion is to be considered among the three models of the models a, c, and d, the similarity included in each element in the third column of the similarity matrix S depicted in FIG. 11B is referred to and the data 3 with the highest similarity to the model c is determined. The second-most-similar model d with the similarity of "1" to the previously-determined data 3 which is the second highest after the similarity of "0" of the selected model c is determined. As depicted in FIG. 12A, there is calculated the difference "6 (=6−0)" between the error amount in the element of the third row, third column of the error amount matrix F which corresponds to the data 3 among the elements of the selected model c and the error amount in the element of the third row, fourth column of the error amount matrix F which corresponds to the data 3 among the elements of the second-most-similar model d.

Since the model c is a substitution model of the model b regarding the data 2, the data 2 imitated as the data with the highest similarity to the model c is further determined. The second-most-similar model d with the similarity of "2" to the previously-determined data 2 which is the second highest after the similarity of "1" of the selected model c is determined. As depicted in FIG. 12A, there is calculated the difference "3 (=4−1)" between the error amount in the element of the second row, third column of the error amount matrix F which corresponds to the data 2 among the elements of the selected model c and the error amount in the element of the second row, fourth column of the error amount matrix F which corresponds to the data 2 among the elements of the second-most-similar model d.

These differences in the error amounts are added up and the degree of impact of the exclusion of the model c is calculated as "9 (=6+3)", Next, when the model d is selected as the interpretable model whose exclusion is to be considered among the three models of the models a, c, and d, the similarity included in each element in the fourth column in the similarity matrix S depicted in FIG. 11B is referred to and the data 4 with the highest similarity to the model d is determined. The second-most-similar model a with the similarity of "2" to the previously-determined data 4 which is the second highest after the similarity of "0" of the selected model d is determined. In this case, the excluded model e is ignored as a matter of course. As depicted in FIG. 12A, the difference between the error amount in the element of the fourth row, fourth column of the error amount matrix F which corresponds to the data 4 among the elements of the selected model d and the error amount in the element of the first row, fourth column of the error amount matrix F which corresponds to the data 4 among the elements of the second-most-similar model a is calculated and the degree of impact of the exclusion of the model d is calculated as "6 (=6−0)".

When the degrees of impact of the three models of the models a, c, and d are calculated as described above, as depicted in FIG. 11B, exclusion of the model d whose degree of impact is calculated to be the smallest among the three models of the models a, c, and d, for example, the darkly-shaded fourth column is determined.

At this stage, there are two interpretable models remaining after the exclusion of the model d which are the models a and c and the number of the interpretable models is reduced to the predetermined number of "2". Accordingly, the exclusion of the fourth interpretable model is not executed and the models a and c remaining without being excluded are extracted as the representative examples.

Excluding the interpretable model with the smallest difference in the classification error to the second-most-similar interpretable model increases the possibility that an interpretable model whose exclusion has a large impact is kept to the end. As a result, this suppresses occurrence of the case where an optimal solution for one of the error matrix E and the similarity matrix S is left out when the greedy method is applied to the other one of the similarity matrix S and the error matrix E as in the application of the normal greedy method.

FIG. 13 is a diagram for explaining one aspect of the effect. FIG. 13 depicts presence or absence of complex calculation, calculation cost, whether the representative examples are extracted from the viewpoint of error or not, and calculation time for each of related art, Reference Technique 1, and this embodiment. Among these items, in the calculation time, there is depicted a value in the case where, for example, the number N of the interpretable models is 1000 and the number of pieces of reference data is 100, assuming that the pieces of hardware used respectively for related art, Reference Technique 1, and this embodiment have the same specifications.

As depicted in FIG. 13, in related art, since the combinatorial optimization problem is executed, complex calculation is performed. In related art, a set of $n^3+n^2+n$ simultaneous equations is calculated to solve the combinatorial optimization problem. In related art, since the combinatorial optimization problem is solved, the representative examples may be extracted from the viewpoint of error. In related art, calculation takes a period of three days or more.

Meanwhile, in Reference Technique 1, the greedy method which is an approximation algorithm is applied instead of the combinatorial optimization problem and complex calculation is not required. In Reference Technique 1, the calculation cost may be reduced to matrix operations as many as n×the number of pieces of reference data by applying the greedy method. In Reference Technique 1, since the representative examples may be extracted only from one viewpoint, for example, the viewpoint of similarity, it is difficult to extract the representative examples from the viewpoint of error. In Reference Technique 1, calculation is completed in about 30 minutes.

In this embodiment, the elimination greedy method which is an approximation algorithm is applied instead of the combinatorial optimization problem and complex calculation is not required. In this embodiment, the calculation cost may be reduced to matrix operations as many as n×the number of pieces of reference data by applying the elimination greedy method. In this embodiment, it is possible to exclude the interpretable models from two viewpoints, for example, viewpoints of both of similarity and error and keep the interpretable models whose exclusion would have a large impact to the end. Accordingly, the representative examples may be extracted also from the viewpoint of error. In this embodiment, calculation is completed in about 30 minutes.

[Flow of Processing]

The following describes the processing flow of the model output device 10 according to this embodiment. In this section, (1) learning model generation processing executed by the model output device 10 is described and then (2) model output processing executed by the model output device 10 is described.

(1) Learning Model Generation Processing

Figure 14:
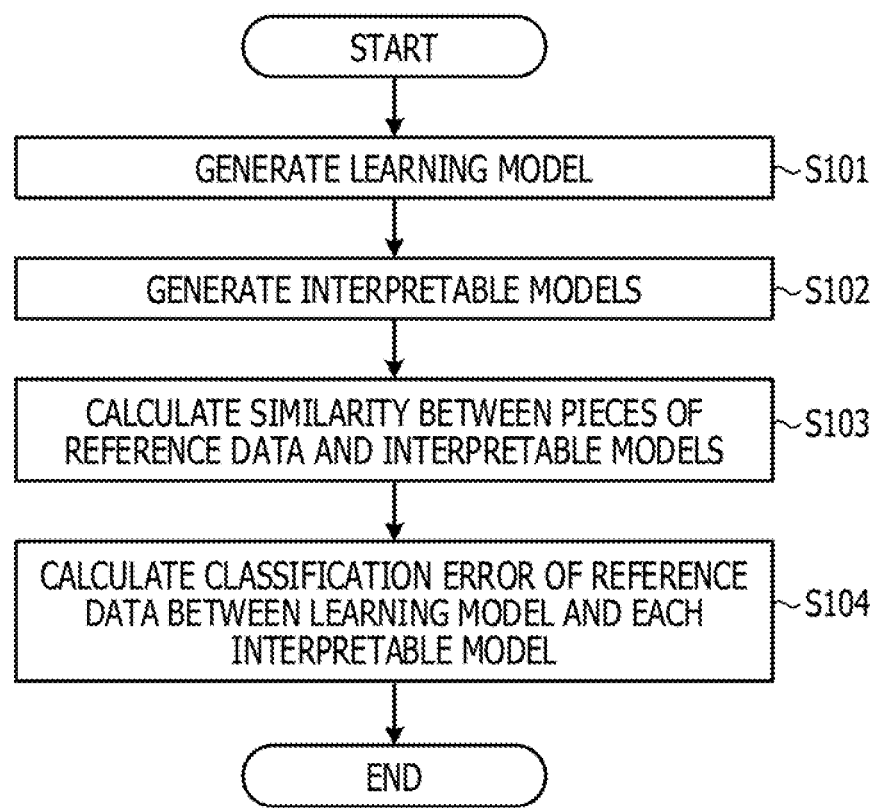
FIG. 14 is a flowchart depicting steps of learning model generation processing according to Embodiment 1.

FIG. 14 is a flowchart depicting steps of the learning model generation processing according to Embodiment 1. This processing may be started, for example, in response to reception of a request for generating a learning model. The processing is not limited to this and may be started at any timing as long as the learning data 11A is obtained.

As depicted in FIG. 14, the learner 11 generates the learning model 12 by learning the parameters of the classifier f by using the learning data 11A (step S101). Next, the generator 13 generates the models g whose outputs are locally approximate to the output of the learning model 12 in the proximity of the data u as the interpretable model 14 according to the algorithm of LIME (step S102).

The first calculator 15 calculates the similarity between the reference data and the interpretable model for all combinations of the pieces of reference data included in the reference data 11B and the interpretable models included in the interpretable model 14 (step S103).

Then, the second calculator 16 calculates the classification error of the reference data between the learning model 12 and the interpretable model for all combinations of the pieces of reference data included in the reference data 11B and the interpretable models included in the interpretable model 14 (step S104). The processing is terminated after the execution of step S104.

(2) Model Output Processing

Figure 15:
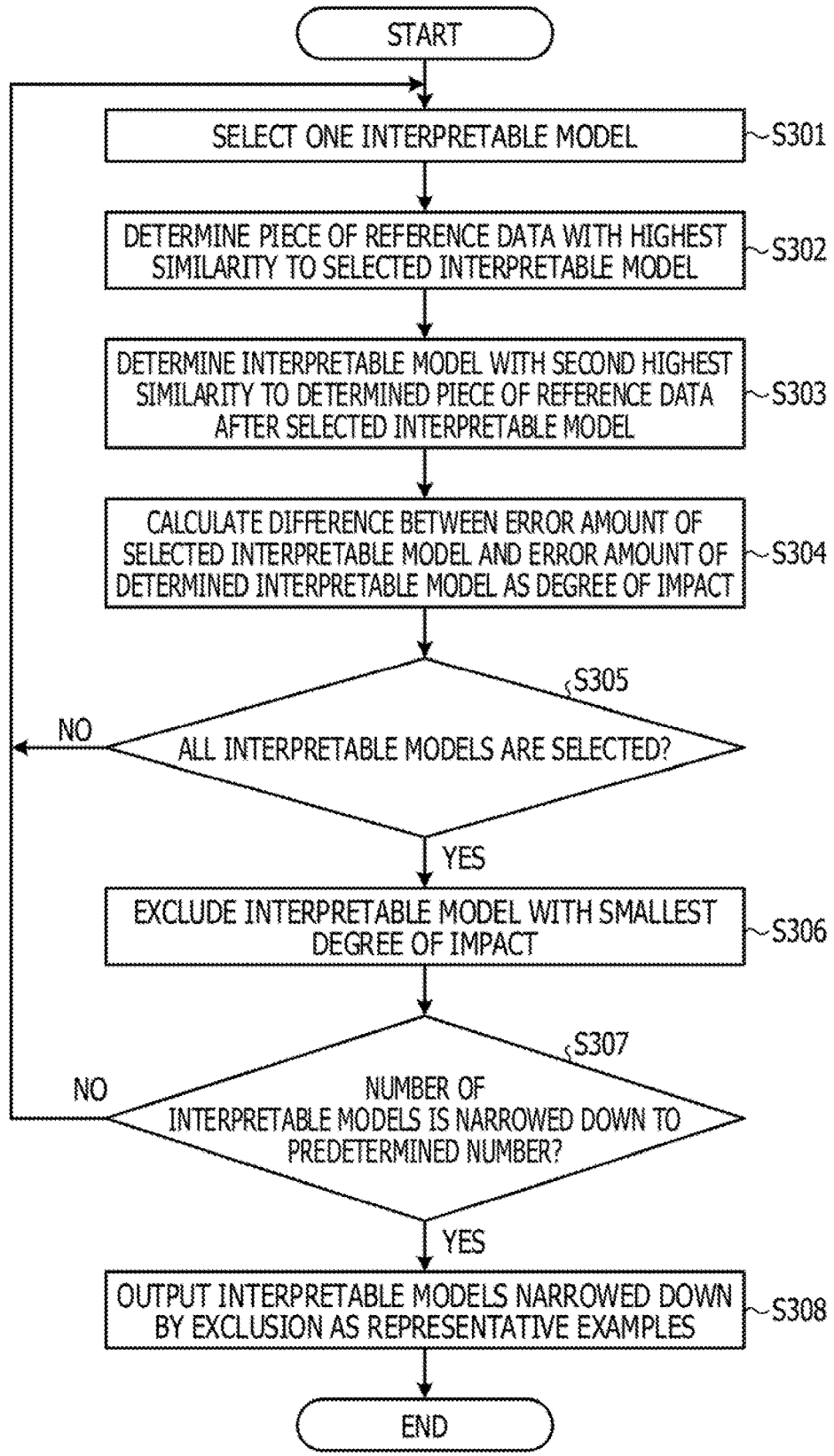
FIG. 15 is a flowchart depicting steps of model output processing according to Embodiment 1.

FIG. 15 is a flowchart depicting steps of the model output processing according to Embodiment 1. This processing may be started at any time after the calculation of the similarity by the first calculator 15 and the calculation of the classification error by the second calculator 16.

As depicted in FIG. 15, the determiner 17 selects one of unselected interpretable models among the multiple interpretable models included in the interpretable model 14 (step S301). Next, the determiner 17 refers to the aforementioned similarity matrix S and determines the piece of reference data with the highest similarity to the selected interpretable model (step S302).

The determiner 17 determines the second-most-similar interpretable model with the second highest similarity to the piece of reference data determined in step S302 after the selected interpretable model (step S303). The determiner 17 calculates the degree of impact of the selected interpretable model based on the error amount of the selected interpretable model and the error amount of the second-most-similar interpretable model (step S304).

Thereafter, the aforementioned processing from step S301 to step S304 is executed until all interpretable models are selected (No in step S305). When all interpretable models are selected (Yes in step S305), the excluder 18 excludes the interpretable model with the smallest degree of impact among the multiple interpretable models (step S306).

The aforementioned processing from step S301 to step S306 is repeated until the number of the interpretable models remaining after the exclusion reaches the predetermined number (No in step S307). Thereafter, when the number of the remaining interpretable models reaches the predetermined number (Yes in step S307), the output unit 19 outputs the remaining interpretable models narrowed down by the exclusion as the representative examples (step S308). The processing is terminated after the execution of step S308.

[One Aspect of Effects]

As described above, in the model output, device 10 according to this embodiment, the elimination greedy method is applied in which the viewpoint of elimination method which is "preferentially delete the less required" is added to the idea of the greedy method which is "keep the better". For example, the model output device 10 according to this embodiment determines, for each of the multiple interpretable models locally approximated to the classifier to be explained, the second-most-similar interpretable model which is most similar to the test data after the interpretable model, the test data being most similar to the interpretable model, excludes the interpretable model with the smallest difference in the classification error to the second-most-similar interpretable model, and outputs the remaining interpretable model as the representative example.

Excluding the interpretable model with the smallest difference in the classification error to the second-most-similar interpretable model increases the possibility that an interpretable model whose exclusion has a large impact is kept to the end. As a result, this suppresses occurrence of the case where an optimal solution for one of the error matrix E and the similarity matrix S is left out when the greedy method is applied to the other one of the similarity matrix S and the error matrix E as in the application of the normal greedy method.

Thus, the model output device 10 according to this embodiment may reduce the calculation cost to matrix operations as many as n×the number of pieces of reference data as in Reference Techniques 1 and 2 and also improve the extraction accuracy of the representative examples from those of related art and Reference Techniques 1 and 2.

Embodiment 2

While the embodiment relating to the device of the present disclosure has been described, the present disclosure may be implemented in various different forms other than the embodiment described above. Other embodiments of the present disclosure are described below.

[Application Example of Learning Model]

In Embodiment 1 described above, description is given of the case where the classifier to be explained is the learned model learned by deep tensor. However, the present disclosure is not limited to this and any method of calculating similarity may be used. For example, the classifier to be explained may be a classifier learned by machine learning other than deep tensor such as, for example, discriminant function. In this case, the similarity matrix S may be generated by calculating a model from the reference data and comparing the model calculated from the reference data and the interpretable models generated from the classifier to calculate the similarity. Alternatively, the similarity matrix S may be generated by recording learning data used to generate the interpretable models together with the interpretable models and comparing the recorded data and the reference data to calculate the similarity.

[Distribution and Integration]

The various components of the devices depicted in the drawings may not be physically configured as depicted in the drawings. Specific forms of the separation and integration of the devices are not limited to the depicted forms, and all or a portion thereof may be separated and integrated in any units in either a functional or physical manner depending on various loads, usage states, and the like. For example, the learner 11, the generator 13, the first calculator 15, the second calculator 16, the determiner 17, the excluder 18, or the output unit 19 may be coupled to the model output device 10 over a network as an external device. The learner 11, the generator 13, the first calculator 15, the second calculator 16, the determiner 17, the excluder 18, or the output unit 19 may be provided in a separate apparatus and may be coupled over a network for cooperation to implement the functions of the model output device 10.

[Model Output Program]

The various kinds of processing described in the aforementioned embodiments may be implemented by executing a program prepared in advance on a computer such as a personal computer or a work station. In the following, with reference to FIG. 16, description is given of an example of a computer for executing a model output program having the same functions as those of the aforementioned embodiments.

Figure 16:
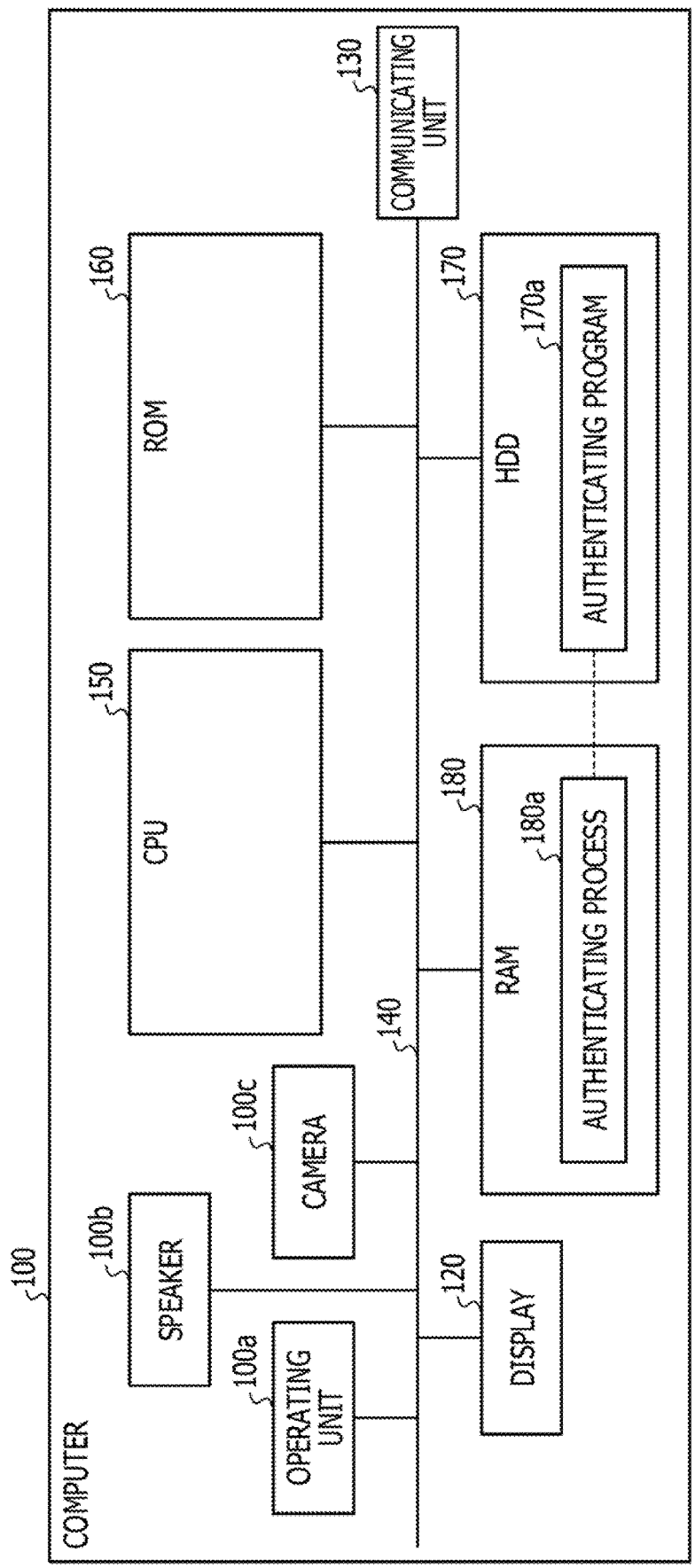
FIG. 16 is a diagram depicting an exemplary hardware configuration of a computer configured to execute the model output program according to Embodiments 1 and 2.

FIG. 16 is a diagram depicting an exemplary hardware configuration of a computer configured to execute the model output program according to Embodiments 1 and 2. As depicted in FIG. 16, a computer 100 includes an operation unit 110a, a speaker 110b, a camera 110c, a display 120, and a communication unit 130. The computer 100 also includes a CPU 150, a read-only memory (ROM) 160, an HDD 170, and a RAM 180. These units 110 to 180 are coupled to each other via a bus 140.

As depicted in FIG. 16, the HDD 170 stores a model output program 170a which performs the same functions as those of the learner 11, the generator 13, the first calculator 15, the second calculator 16, the determiner 17, the excluder 18, and the output unit 19 described in the aforementioned Embodiment 1. The model output program 170a may be provided integrally or separately like the components of the learner 11, the generator 13, the first calculator 15, the second calculator 16, the determiner 17, the excluder 18, and the output unit 19 depicted in FIG. 1. For, example, the HDD 170 may not have to store all data described in the aforementioned Embodiment 1, and data used in processing may be stored in the HDD 170.

Under the aforementioned environment, the CPU 150 reads the model output program 170a from the HDD 170 and loads the model output program 170a into the RAM 180. As a result, the model output program 170a functions as a model output process 180a as depicted in FIG. 16. The model output process 180a loads various kinds of data read from the HDD 170 into an area allocated to the model output process 180a in a storage area included in the RAM 180, and executes various kinds of processing using these various kinds of data thus loaded. For example, the processing performed by the model output process 180a includes the processing depicted in FIGS. 14 and 15, Not all the processors described in Embodiment 1 have to operate on the CPU 150, but only a processor(s) required for the processing to be executed may be virtually implemented.

The model output program 170a may not be initially stored in the HDD 170 or the ROM 160. For example, the model output program 170a is stored in a "portable physical medium" such as a flexible disk called an FD, a compact disc (CD)-ROM, a digital versatile disc (DVD), a magneto-optical disk, or an IC card, which will be inserted into the computer 100. The computer 100 may acquire the model output program 170a from the portable physical medium, and execute the model output program 170a. The model output program 170a may be stored in another computer or server apparatus coupled to the computer 100 via a public line, the Internet, a local area network (LAN), a wide area network (WAN), or the like, and the computer 100 may acquire the model output program 170a from the other computer or the server apparatus, and execute the model output program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
 obtaining a plurality of test data used for analysis of a classifier;
 obtaining a plurality of approximation models approximated to the classifier, each of separation boundaries of the plurality of approximation models being approximated to a different part of a separation boundary of the classifier;
 specifying, for each of the plurality of approximation models, a test data having a highest similarity from among the plurality of test data;
 specifying, for each specified test data, an approximation model having a second highest similarity with the specified test data from among the plurality of approximation models;
 selecting, from among the plurality of approximation models, an exclusion target model whose error with the specified approximation model is the smallest for each specified test data; and
 outputting the plurality of approximation models from which the exclusion target model is excluded for each specified test data.

2. The storage medium according to claim 1, wherein
 the specifying the test data includes specifying the test data having the highest similarity for each of the plurality of approximation models from which the exclusion target model is excluded,
 the specifying the approximation model includes specifying, for each of the plurality of the approximation model from which the exclusion target model is excluded, the approximation model having the second highest similarity with the test data having the highest similarity, and
 the outputting includes repeating a process for excluding the exclusion target model from the plurality of approximation models until the plurality of approximation models from which the exclusion target model is excluded satisfy a predetermined condition.

3. The storage medium according to claim 1,
 wherein the plurality of approximation models are locally approximated to the classifier according to an algorithm of local interpretable model-agnostic explanations (LIME).

4. A model output method executed by a computer, the model output method comprising:
 obtaining a plurality of test data used for analysis of a classifier;
 obtaining a plurality of approximation models approximated to the classifier, each of separation boundaries of the plurality of approximation models being approximated to a different part of a separation boundary of the classifier;
 specifying, for each of the plurality of approximation models, a test data having a the highest similarity from among the plurality of test data;
 specifying, for each specified test data, an approximation model having a second highest similarity with the specified test data from among the plurality of approximation models;
 selecting, from among the plurality of approximation models, an exclusion target model whose error with the specified approximation model is the smallest for each specified test data; and
 outputting the plurality of approximation models from which the exclusion target model is excluded for each specified test data.

5. A model output device, comprising:
 a memory; and
 a processor coupled to the memory and configured to:
  obtaining a plurality of test data used for analysis of a classifier;
  obtain a plurality of approximation models approximated to the classifier, each of separation boundaries of the plurality of approximation models being approximated to a different part of a separation boundary of the classifier,
  specify, for each of the plurality of approximation models, a test data having a the highest similarity from among the plurality of test data,
  specify, for each specified test data, an approximation model having second highest similarity with the specified test data from among the plurality of approximation models,
  select, from among the plurality of approximation models, an exclusion target model whose error with the specified approximation model is the smallest for each specified test data, and
  output the plurality of approximation models from which the exclusion target model is excluded for each specified test data.

6. The model output device according to claim 5, wherein the processor is configured to:
 specify the test data having the highest similarity for each of the plurality of approximation models from which the exclusion target model is excluded,
 specify, for each of the plurality of the approximation model from which the exclusion target model is excluded, the approximation model having the second highest similarity with the test data having the highest similarity, and
 repeat a process for excluding the exclusion target model from the plurality of approximation models until the plurality of approximation models from which the exclusion target model is excluded satisfy a predetermined condition.

7. The model output device according to claim 5,
 wherein the plurality of approximation models are locally approximated to the classifier according to an algorithm of local interpretable model-agnostic explanations (LIME).

* * * * *